United States Patent [19]

Weiler

[11] 3,833,240
[45] Sept. 3, 1974

[54] RETRACTABLE STEP FOR USE WITH TRAILERS, MOTOR HOMES, OR OTHER VEHICLES

[76] Inventor: Raywood C. Weiler, 17586 Vine St., Fontana, Calif. 92335

[22] Filed: Nov. 17, 1972

[21] Appl. No.: 307,493

[52] U.S. Cl. ................................ 280/166, 182/88
[51] Int. Cl. .............................................. B60r 3/02
[58] Field of Search ............ 280/166; 105/445, 448; 182/88

[56] References Cited
UNITED STATES PATENTS

| | | | |
|---|---|---|---|
| 1,063,643 | 6/1913 | Blake | 280/166 |
| 1,242,828 | 10/1917 | Lyle | 280/166 |
| 2,575,615 | 11/1951 | Crump | 280/166 |
| 3,095,216 | 6/1963 | Browne | 280/166 |

*Primary Examiner*—Robert R. Song
*Attorney, Agent, or Firm*—Max R. Kraus

[57] ABSTRACT

A retractable step mounted on the vehicle below the door, which step is pivotally supported to move in a horizontal plane from a retracted out-of-the-way position under the vehicle body to a forwardly extending step-on position which is laterally and forwardly of the door and below the door and is provided with means for releasably locking the step in either retracted or extended position, the step being totally disconnected from the door and operable independently of the opening or closing of the door.

10 Claims, 7 Drawing Figures

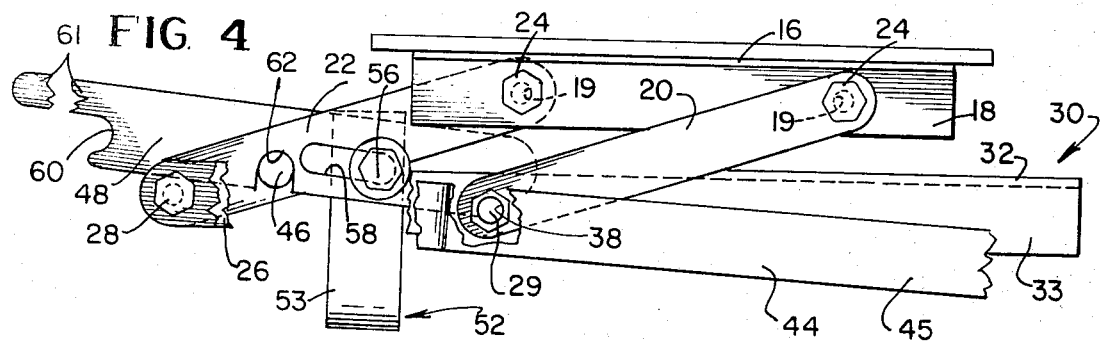
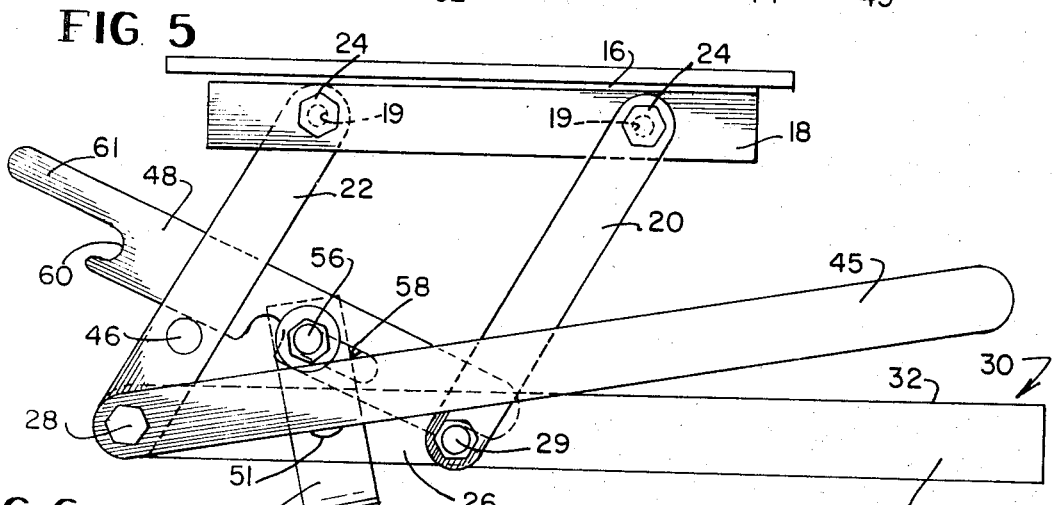
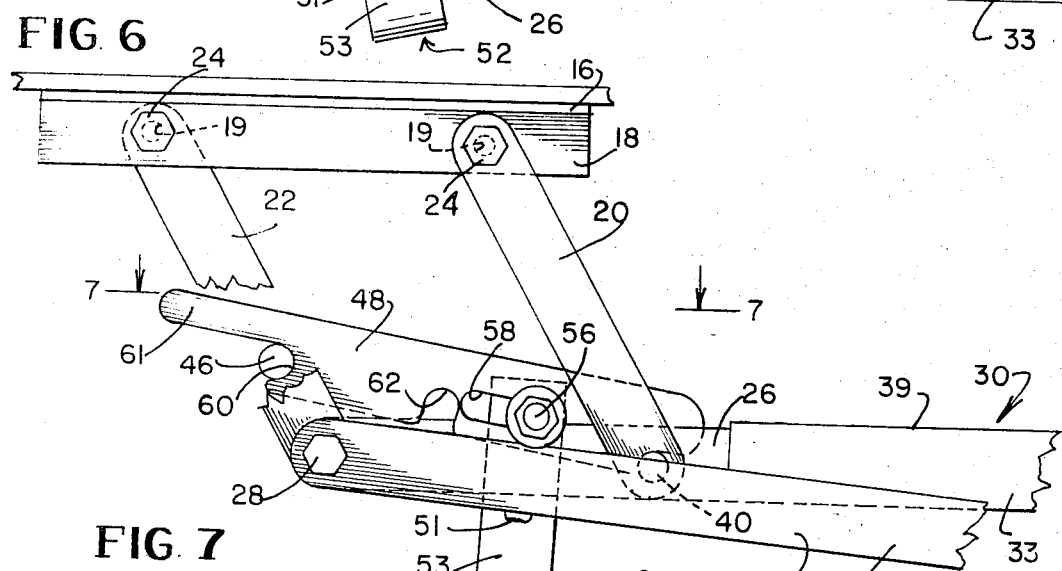
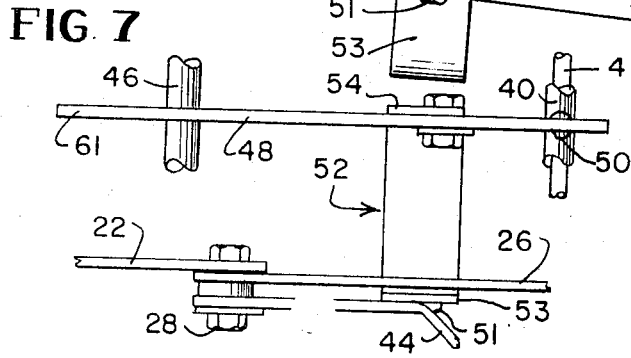

RETRACTABLE STEP FOR USE WITH TRAILERS, MOTOR HOMES, OR OTHER VEHICLES

BRIEF SUMMARY OF THE INVENTION

Trailers, motor homes and like vehicles have become very popular and are in great use. It is recognized that the floor level of the trailer, motor home or other vehicle is spaced at a considerable elevation from the ground surface which makes it inconvenient and sometimes hazardous to step from the ground surface to the floor of the vehicle and vice versa. It is therefore desirable that a step be positioned intermediate the floor level of the vehicle and the ground so that a person can readily step on same when getting into or out of the vehicle. It is also desirable that the step be operated into either retracted or extended position independently of the door and without regard to the opening or closing of the door. With such an arrangement the movement of the door does not affect the operation of the retractable step. The retractable step is releasably locked in either retracted or extended position.

An object of this invention therefore is to provide a step having the foregoing characteristics and which is simple and relatively inexpensive to manufacture, which may be readily installed by an inexperienced person and which can be provided either as an accessory to such vehicles already in use or may be initially installed in newly manufactured vehicles.

BRIEF DESCRIPTION OF THE DRAWINGS

In the drawings:

FIG. 4 is a side elevational view with the step retracted;

FIG. 5 is a view similar to FIG. 4 but with the step partially extended;

FIG. 6 is a side elevational view with the step in extended position; and

FIG. 7 is a top plan view taken on line 7—7 of FIG. 6.

Figure 1:
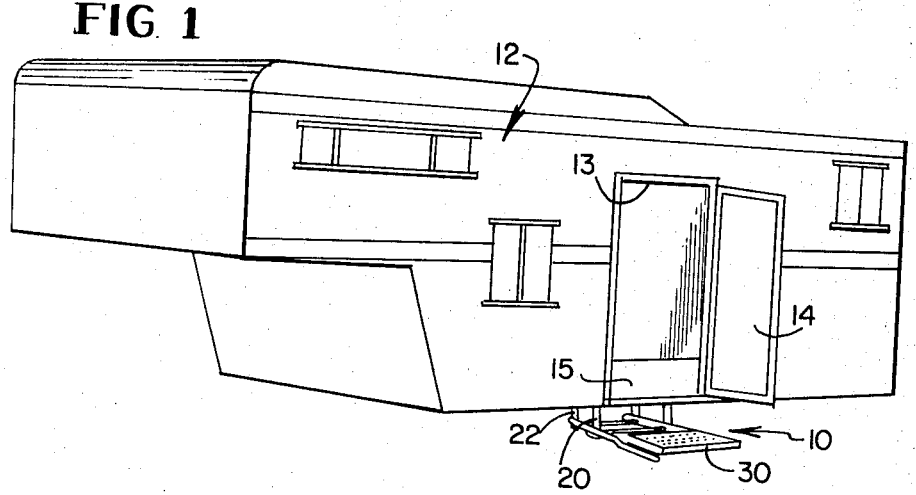
FIG. 1 is a perspective view showing the invention attached to the vehicle with the step in extended position.

The entire structure forming this invention and hereinafter described is formed of a heavy gauge sheet metal and the rods and other components are likewise formed of metal stock.

The entire unit of this invention is generally designated by the numeral 10 and same is attachable to and is supported on the underside of the vehicle adjacent the door. The vehicle is generally designated at 12, the door frame opening at 13, and the door at 14 which is hinged at one side in the conventional manner, and the vehicle floor at 15.

The structure includes a pair of angle or inverted L-shaped spaced strips 16, each provided with a plurality of spaced openings 17 which receive suitable fastening elements, which in turn are secured to the underside of the floor surface of the vehicle or to the frame of the vehicle so that the spaced strips 16 are suitably fastened or anchored to the vehicle and provides the support for the device. The spaced strips 16 form the upper part of the device. The vertical portions 18 of the L-shaped strips 16 are each provided with a pair of spaced openings 19 for pivotally supporting a pair of links, namely front link 20 and rear link 22. The pair of links 20 and 22 are pivotally connected adjacent their upper ends as at 24 to each of said strips 16 by fastening elements or pins passing through the openings in the top of the links and through the openings 19 in the strips 16.

Similarly, the lower end of the rear link 22 is provided with an opening to receive a fastening element or pin passing through suitably alined openings in the step extensions 26 whereby they are pivotally connected as at 28 at the rear to said extensions for pivotally supporting the step, as will be presently described. The front links 20 are also pivotally connected as at 29 to the step extensions, the pivotal connections at 29 being through a cross bar, to be presently described. The pair of links 20 and 22 on each side are in spaced relation to each other and are always parallel so that as they pivot they pivot in unison and always in parallel relation as the step is moved from its retracted position to its forward position. The links 20 and 22, strip 16, and step extension 26 form a four bar linkage or parallelogram.

The step, generally designated by the numeral 30, comprises a tread portion 32 which is of rectangular shape and said step is provided with downwardly extending side flanges 33 and front and rear flanges 34 and 35, all suitably connected to form a continuous downwardly extending flange for the purpose of providing rigidity and support for the tread portion of the step. The tread portion of the step is provided with a plurality of spaced openings 36 surrounded by raised bosses 37 which serve to rigidify the step as well as to prevent slippage of the person's foot while stepping on said step. The step may be built with a flat surface and a non-skid material applied thereto to prevent slippage.

Rigidly secured to the step, either as a separate component welded thereto or integrally formed therewith, on each side thereof, is the rearwardly extending step extension 26. Each step extension is provided with an opening 38 adjacent the rear of the tread of the step. A transversely extending tube 40 supported on a rod 41 extends between the step extensions 26 rearwardly of the tread portion of the step. The rod has a head 41a at one end and a push nut 42 is secured on the opposite end of the rod. The rod 41 extends through the openings in the step extensions 26 and the openings in the front links 20 and through the interior of tube 40 and is secured to said step extensions and front links to support the tube 40. Said front cross rod 41 forms the front pivotal connection 29.

A single manually operable lever, generally indicated at 44, is also pivotally supported on the rear pivot 28 adjacent one side of the step. The rear portion 45 of the lever 44 extends in a vertical plane, with the front portion 45' also in a vertical plane where it may be readily grasped by the hand for operating the lever 44. Thus, the step is pivotally supported on each side by each pair of spaced parallel arranged links, all four links moving in unison as the step moves from its retracted position to its extended position, the movement of the step always being in a parallel plane from retracted to extended position and vice versa.

Extending between the rear links 22 and supported by said links is a cross bar or rod 46, the opposite ends of which are brazed or welded or otherwise permanently attached to the rear links 22. This cross bar is sometimes hereinafter referred to as the latching bar for it is to be engaged by a pair of latching levers 48 and 49 which are operated by the manual lever 44. The front ends of the latching levers 48 and 49 are fixedly secured as at 50 to the cross rod 40 so that as said latching levers operate the rod 40 will rotate therewith.

Fixedly brazed or welded as at 51 to the vertical portion 45 of the manual lever 44 is a U-shaped bracket 52 which has its outer vertical leg 53 welded to the manual lever 44. The outer vertical leg 53 of the bracket 52 is positioned adjacent one of the rearward step extensions 26. The opposite or inner vertical leg 54 of said U-shaped bracket 52 extends upwardly of the top plane of outer leg 53 of the bracket and is provided with an opening for receiving and supporting a connecting or fastening pin or member 56 which connects with the latching lever 48. The latching lever 48 has an elongated slot 58 in which the fastening pin or member 56 slides. As the manual lever 44 is manually operated it will through the U-shaped bracket 52 and connecting member 56 operate the latching lever 48 which through rod 40 simultaneously operates the other latching lever 49.

Figure 2:
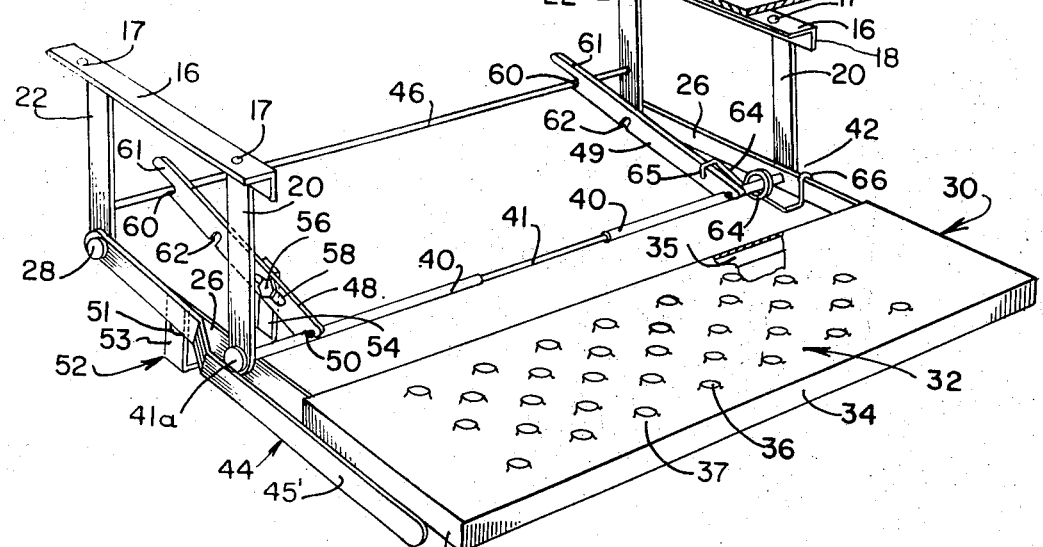
FIG. 2 is a view showing the invention with the step in extended position.
Figure 3:
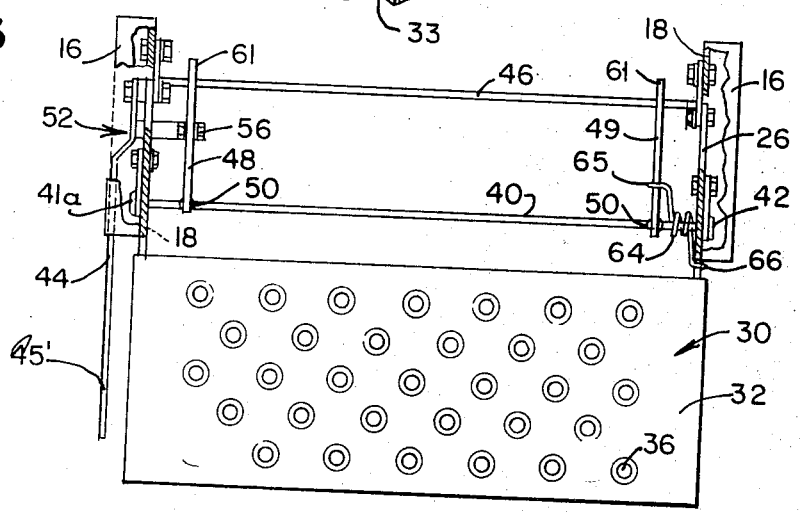
FIG. 3 is a top plan view of same partly in section.

The rear end of each of said latching levers 48 and 49 is provided with a cutout or recess 60 for engagement with the cross latching bar 46 to maintain the step in its extended in-use position, as best shown in FIGS. 2 and 6. Extending rearwardly of the recess is an extension 61 on said latching levers 48 and 49. The extensions 61 provide a safety feature in that if the step is pulled out too far, the latching levers will not drop out of latching position. The latching levers 48 and 49 are also each provided with a downwardly facing notch or recess 62 forwardly of the rear of the latching levers which engage the latching bar 46, as shown in FIG. 4, for locking the step in its non-use or retracted position.

A spring member, generally designated at 64, is coiled around the rod 40 and has one end attached as at 65 to the latching lever 49 with the opposite end of said spring attached as at 66 to the step extension 26. The spring 64 will maintain a downward pressure on latching lever 49 in a counterclockwise direction, as viewed in FIG. 2, so that it tends to engage the latching rod 46 through the recesses 60 or 62 to maintain the step in locked position, either retracted or extended. The latching lever 49 will through the rod 40 also maintain the latching lever 48 in the same locking position. It is only when the manual lever 44 is operated that the latching levers will be rocked in a clockwise direction to permit unlatching.

Operation

It is believed that the operation of the retractable step is clear from the foregoing description, however, it will now be briefly summarized.

In the position of the step as shown in FIG. 4, the pairs of links 20 and 22 are inclined rearwardly and the step is retracted but in a horizontal plane and spaced from the vehicle frame and directly under the door. In this position the latching levers 48 and 49 have their cutouts or recesses 62 in engagement with the latching bar 46 and the latching levers are urged into latching position by means of the spring 64 which urges the latching levers downwardly. As the spring 64 urges the latching lever 49 downwardly, the cross rod 40 is rocked or rotated slightly counterclockwise so that both latching levers 48 and 49 are simultaneously latched to the latching bar 46 through engagement with the recesses 62 and holds the step in retracted position, as shown in FIG. 4. In this retracted position it does not interfere with the travel movement of the vehicle as it does not extend any appreciable distance forwardly of the side of the vehicle. In the retracted position of the step, the door of the vehicle can be opened and closed and there is no interference or connection between the movement of the door and the step.

When it is desired to operate the step to a forward extended or in-use position, as in FIG. 2, the manual lever 44 is manually engaged adjacent the front end thereof and is pivoted upwardly. The upward pivoting of the manual lever will simultaneously move the U-shaped bracket 52 upwardly and as the U-shaped bracket moves upwardly it will cause the connector pin 56 connected thereto to ride upwardly in the elongated slot 58 of the latching lever 48 and since the latching member is fixedly connected to the cross rod 40 it will rotate the cross rod clockwise slightly and simultaneously elevate both latching levers 48 and 49 so that the latching recesses 62 thereof disengage from the latching bar 46. As this takes place the step is unlatched or unlocked for forward movement since when released by the latching levers the step can be manually pulled outwardly or forwardly.

When the step is disengaged from its retracted position and is manually moved forward, the links 20 and 22 will then move through an arc downwardly, as in FIG. 5, and then to a forwardly inclined position, as in FIG. 6, which positions the step forwardly in an accessible and step-on position. When the step is moved forwardly to the position shown in FIGS. 2 and 6, it gets into latching or locked position again by the rear recesses 60 of the latching levers engaging the cross latching bar 46. This takes place automatically with the forward manual movement of the step since the spring 64 will tend to bear down against the latching lever 49 and through the cross bar 40 will rock the cross bar counterclockwise to simultaneously latch the other latching lever 48 to the latching bar 46.

When the step is in its forward latched position a person may step on it with perfect safety since the step is latched and any pressure against the step will only urge the latching levers against the latching bar 46 to more firmly latch the step in position. To unlatch the step from its latched extended position, the step is manually pulled slightly forwardly and the manual lever 44 is depressed and this will cause the latching lever 48 to pivot upwardly to raise or elevate the rear end of the latching levers 48 and 49 so that the step can be manually pushed rearwardly so that the pairs of links 20 and 22 swing through an arc to their rearward position where the step moves to its retracted position and becomes automatically locked, as previously described.

What is claimed is:

1. A retractable step for use with vehicles and the like comprising, a step, a pair of front and rear links pivotally secured to each side of the step, with the upper portion of said links pivotally connected to a support secured to the vehicle and with the lower portion of the links pivotally connected to the step for supporting said step for movement in a substantially horizontal plane from a retracted position to an extended in-use position and vice versa, means for locking or latching said step in extended position and in retracted position, said last mentioned means including a latching bar secured to and extending between the rear links and a latching lever supported on a front cross-bar extending between the front links for locking engagement with said latching bar in either extended or retracted position of said step, said latching lever being manually actuated, and spring means biasing the latching lever towards latching position.

2. A structure as set forth in claim 1 in which the step moves through an arc while in a horizontal plane and in which the step when in extended position is below the horizontal plane of the floor of the vehicle and extends outwardly of the vehicle and when in retracted position is substantially underneath the floor of the vehicle.

3. A structure as set forth in claim 2 in which a latching bar is secured to and extends transversely between the rear links of the pairs of links and in which a latching lever is manually operated to lock the step in either extended or retracted position.

4. A structure as set forth in claim 1 in which the latching lever is provided with spaced notches for engaging the latching bar, the rearmost of said notches when engaged locking the step in extended position and the forward notches when engaged locking the step in retracted position.

5. A structure as set forth in claim 1 in which when the latching lever is manually actuated the front cross bar is rotated or rocked.

6. A structure as set forth in claim 1 in which the step has a rearward extension on each side thereof and in which the pair of pivotally mounted links are pivotally connected at their lower ends on each side to each said extension and at their upper ends to a horizontal support to form a four bar linkage and wherein the links move in a parallel relation when the step is moved from retracted to extended position.

7. A structure as set forth in claim 1 in which there is a pair of latching levers supported on the front cross-bar for engagement with the latching lever and wherein the spring means bias both said latching levers towards latching position.

8. A structure as set forth in claim 7 in which a manually engageable lever is connected to one of said latching levers for simultaneously operating said pair of latching levers.

9. A structure as set forth in claim 1 in which a manually engageable lever is connected to said latching lever for operating said latching lever.

10. A retractable step for use with vehicles and the like comprising, a step, a pair of front and rear links pivotally secured to each side of the step with the upper portion of said links pivotally connected to a horizontal support secured to the vehicle and with the lower portion of the links pivotally connected to the step for supporting said step for movement in a substantially horizontal plane from a retracted position to an extended in-use position and vice versa, said horizontal support and said step with said links forming a four bar linkage wherein the links move in a parallel relation when the step is moved from retracted to extended position, means for locking or latching said step in extended position and in retracted position, said last mentioned means including a latching member secured to and extending between the rear links and a latching lever supported on a cross bar connected to and extending between the front links for locking engagement with the latching member in either extended or retracted position of said step, said latching lever being manually actuated, and spring means biasing said latching lever towards latching position.

* * * * *